United States Patent [19]

Butts

[11] Patent Number: 4,537,373

[45] Date of Patent: Aug. 27, 1985

[54] AIR VEHICLE HAVING DRIVEN WHEELS AND DUCTED FANS

[76] Inventor: Dennis D. Butts, 2057 S. Estrella Cir., Mesa, Ariz. 85202

[21] Appl. No.: 67,195

[22] Filed: Aug. 16, 1979

[51] Int. Cl.³ ............................................. B64C 37/00
[52] U.S. Cl. .................................. 244/22; 244/53 B; 244/120; 244/50
[58] Field of Search ...................... 244/2, 12.1, 13, 15, 244/55, 50, 65, 60, 135 R, 58, 53 R; 296/1 S; 180/7 P, 7 J, 903

[56] References Cited

U.S. PATENT DOCUMENTS

| | | | |
|---|---|---|---|
| 1,495,812 | 5/1924 | Senéze | 180/7 P |
| 1,708,249 | 4/1929 | Abel | 244/58 |
| 2,177,499 | 10/1939 | Schairer | 244/55 |
| 2,215,003 | 9/1940 | Johnson | 244/2 |
| 2,477,637 | 8/1949 | Mercier | 244/15 |
| 2,494,090 | 1/1950 | Gwinn, Jr. | 244/13 |
| 2,593,785 | 4/1952 | Nye et al. | 244/2 |
| 2,623,721 | 12/1952 | Harrington | 244/135 R |
| 2,719,014 | 9/1955 | Koppen | 244/13 |
| 2,725,944 | 12/1955 | Lee et al. | 296/1 S |
| 2,767,939 | 10/1956 | Taylor | 244/2 |
| 2,770,427 | 11/1956 | Schreffler | 244/2 |
| 2,944,765 | 7/1960 | Lane et al. | 244/15 |
| 3,060,685 | 10/1962 | Tonnier et al. | 244/55 |
| 3,078,062 | 2/1963 | Fischer | 244/12.1 |
| 3,090,581 | 5/1963 | Einarsson | 244/2 |
| 3,117,545 | 1/1964 | Warner | 180/116 |
| 3,317,161 | 5/1967 | Sawyer | 244/2 |
| 3,790,105 | 2/1974 | Eickmann | 244/53 R |

FOREIGN PATENT DOCUMENTS

| | | | |
|---|---|---|---|
| 1220261 | 6/1966 | Fed. Rep. of Germany | 244/55 |
| 1236134 | 6/1960 | France | 244/2 |
| 23717 | 10/1909 | United Kingdom | 244/60 |

OTHER PUBLICATIONS

Wood, *Aerspace Vehicle Design*, vol. 1, 1968, p. A145, Johnson Publ. House Co.
McCormick, *Aerodynamics of V/STOL Flight*, 1967, p. 95, Academic Press.
Hovey, "Ducted Fans for Light Aircraft", 1977.

*Primary Examiner*—Galen L. Barefoot
*Attorney, Agent, or Firm*—Lowe, King, Price & Becker

[57] ABSTRACT

An air vehicle has a passenger section, a tail section including variable camber air foil wings and horizontal and vertical control surfaces, ducted fan propellers and landing gear wheels driven by an engine. The landing gear wheels accelerate the vehicle until the fans produce sufficient thrust, at which time the ducted fans propel the vehicle into flight. In one embodiment, while the tail section is detached, the passenger section can be used as a land vehicle. Alternatively, the passenger section and tail section are formed as a single unit in which case the vehicle is used solely as an airplane.

31 Claims, 17 Drawing Figures

Fig. 8

AIR VEHICLE HAVING DRIVEN WHEELS AND DUCTED FANS

TECHNICAL FIELD

The present invention relates to air vehicles and more particularly to an air vehicle employing ducted fans for airborne propulsion and driven wheels for take-off.

BACKGROUND ART

Various types of vehicles for use as both land and air transportation have been proposed. Generally, such vehicles have taken the form of an automobile-type passenger body and wheeled chassis, in combination with a separable wing and rudder/elevator tail section. In a typical configuration, single or dual pusher type propellers are mounted rearwardly of the passenger body and are driven by one or more internal combustion engines.

Compromises must be made in the construction and configuration of such a land-air vehicle. The vehicle should not be excessively wide for land vehicle use, but must have an aerodynamic shape for good flying characteristics and fuel economy. Wings should be designed for low-speed take-offs and landings while providing good flight characteristics at cruising speeds. However, most vehicles of the type described have been structurally unsound and aerodynamically inefficient.

Several disadvantages of conventional single or dual type propellers in aircraft or land-air vehicles have been recognized. Conventional propellers are designed for maximum thrust and acceleration at take-off speeds and below to ensure short, safe take-off rolls. Such propellers have poor thrust capabilities at other than take-off speeds since as airspeed increases, the proportion of the propeller that creates drag increases, but the propeller thrust area decreases.

Conventional propeller driven aircraft utilize air cooled engines which produce high torque at operating speeds of around 2500-3000 rpm. The propeller is directly driven by the engine. Fuel efficiency at such low engine/propeller speeds is not very good since the aircraft will travel relatively slowly. However, increasing the engine speed to propel the aircraft at higher speeds and increase fuel economy causes other problems. The tip speed of a larger diameter propeller (approximately 80") being driven at high speed can approach the speed of sound. Shock waves will form at the tip, creating additional drag and possible propeller damage. Vortices formed at the tips of the propellers create drag and increase the noise level of the aircraft. In addition, some form of variable pitch should be provided, since optimum propeller pitch angle changes as the speed of the aircraft increases. Because of these problems, conventional propeller driven general aviation aircraft are limited to top airspeeds of around 150 to 200 knots.

To increase cruise efficiency and overcome the disadvantages of the usual two-bladed propeller, smaller multi-bladed propellers called cruise propellers have been used. However, multi-bladed propellers have the disadvantage of more tip vortices, which significantly increase the propeller drag. Because these propellers are designed to be more efficient at cruise speeds, they create longer take-off rolls.

To reduce or eliminate tip vortices in propeller type aircraft, a shroud has been used around the propeller. Such a configuration is commonly known as a "ducted fan". Ducted fans usually include four or more blades, generally of smaller diameter than those of conventional propellers and have thin, narrow airfoils. Ducted fans tend to be quieter and more efficient than conventional propellers because tip vortices are eliminated. The shroud around the fan also lends a measure of safety to ground personnel who are near the aircraft.

A ducted fan can be designed for either low speed or high speed operation, but not for both. A low speed ducted fan (e.g. less than approximately 70 knots air speed) outperforms a conventional propeller at take-off speeds while a high speed (e.g. greater than approximately 70 knots air speed) ducted fan theoretically outperforms a conventional propeller at cruising speeds. When accelerating from low speeds to high speed flight, the blade area of both conventional propellers and ducted fans must change for efficient operation. In the case of conventional propellers, a variable pitch device is used to open the blade angle of the propeller into an airstream as it accelerates from low speed to high speed. Variable pitch provides adequate propeller efficiency at cruise speeds while producing sufficient thrust at take-off speeds. The ducted fan design, however, does not work well with variable pitch. When accelerating from low speeds to high speed flight, the blade area of a ducted fan must change over a greater range than conventional propellers for efficient operation. Hence, either the number or the size of the blades must change, obvious impossibilities. Thus, there is presently available no one particular ducted fan design which produces high thrust at both low and high speeds, while maintaining good fuel economy.

To increase the thrust of a low-speed ducted fan it is known to form the shroud having a cross-section in the form of a cambered airfoil. While this technique increases the low-speed thrust slightly, the additional thrust is gained at the expense of high speed efficiency since the shroud creates drag at high speed. Shrouds for high speed ducted fans have a symmetric airfoil shape developing no additional thrust, but also minimizing drag from the shroud.

If a conventional air-cooled aircraft engine is used to drive a ducted fan, some sort of gearing must be provided since the conventional engine develops maximum torque and power in the range of 2500-3000 rpm while a high speed ducted fan is most efficient and produces maximum thrust at speeds in excess of 6000 rpm. The gearing arrangement introduces a power loss of about 5% in the drive train and lowers the overall performance of the aircraft.

It is well known that single propeller aircraft, both conventional and ducted fan types, have asymmetrical flight characteristics due to torque and "cork-screw" effect exerted by the single rotating propeller on the aircraft body. In some multi-propeller aircraft, opposing pairs of propellers rotate in opposite directions to provide symmetrical flight characteristics and overcome the "cork-screw" effect. However, these designs usually employ two separate engines to drive the propellers with a concomitant increase in aircraft weight, and increased fuel consumption which results in a reduction of fuel economy.

It is therefore an object of the invention to provide an aircraft having good fuel economy at high cruising speeds and which is relatively quiet in operation.

It is a further object to provide such an aircraft having symmetrical flight characteristics and good maneuverability at both low and high speeds.

It is an additional object to provide an aircraft having tail and wing sections detachable from the passenger section so that the passenger section can be used as a land vehicle upon arrival at a destination.

SUMMARY OF THE INVENTION

In accordance with the present invention, an aircraft has high speed ducted fans and power driven landing gear wheels. The low thrust of the ducted fans, at low speeds, is overcome by accelerating the aircraft to take-off speeds by driving the landing gear wheels until the ducted fans develop sufficient thrust to propel the vehicle to take-off. The high-speed ducted fans enable high cruising speeds with good fuel economy to be achieved.

In one embodiment of the invention, passenger and tail sections are formed as a single unit when the vehicle is to be used solely as an airplane. In an alternative embodiment, the vehicle is designed such that the passenger section can be separated from the tail and wing section so that the passenger section can be used as a land vehicle.

The passenger section includes a low-profile passenger compartment, an air flow area formed beneath the passenger compartment, a set of landing gear wheels mounted beneath the passenger section, and a driving engine located behind the passenger compartment and connected to the landing gear wheels. The tail section includes a tapered fuselage, a pair of variable camber wings releasably attached to a forward portion of the fuselage, and a rudder and elevator assembly mounted on a rearward portion of the fuselage. A pair of high-speed counter-rotating ducted fans are mounted in two duct openings formed on either side of the fuselage, the duct openings communicating with the air flow area opening formed beneath the passenger compartment, and the fans being releasably connected to the driving engine.

While high-speed ducted fans produce low thrust at low speeds, the present invention eliminates the need for variable pitch or variable geometry propeller blades to produce sufficient take-off thrust since the driving wheels, which act as the landing gear for the craft, are used to accelerate the vehicle from rest to near take-off speed at which time the ducted fans develop sufficient thrust to continue the acceleration of the craft and propel the craft into take-off.

A single lightweight internal combustion engine is used to power both the ducted fans and the landing gear wheels of the passenger section. The fans are driven in a counter-rotating fashion to produce symmetrical flight and thrust characteristics. The ducted fans provide relatively quiet operation and high thrust-to-drag ratios.

The entire passenger section is streamlined so it has minimum aerodynamic drag at high cruising speeds. The landing gear wheels are arranged below the passenger section and to the sides of the air flow area so that they do not interfere with the passage of air to the intake ducts of the ducted fans. The entire vehicle is built using modern aircraft construction techniques and materials to produce a lightweight but strong structure.

The wings are of narrow cross-section and of low camber and are flown "dry", i.e., no ballast or fuel is carried within the wings. A thin airfoil enables the craft to be flown more efficiently at high speeds. Leading and trailing edge flaps are provided on the wings to change the camber and increase lift at low speeds. In one embodiment, the wings are detachable from the tail section so that they can be folded back for ease of storage or to enable the tail section to be towed.

The main fuel supply for driving the engine is carried in the tail section at a point midway between the wings, to reduce balancing and trim problems as the fuel is loaded or consumed. A small auxiliary fuel tank is disposed within the passenger section to supply the engine when the tail section is detached and the craft is used solely as a ground vehicle.

BRIEF DESCRIPTION OF DRAWINGS

These and other objects, features and advantages of the invention are presented in the following detailed description of the preferred embodiments and illustrated in the accompanying drawings wherein:

FIG. 7 is a left side partial cross-sectional view of the vehicle shown in FIG. 1, illustrating the arrangement of the passenger compartment, engine and main fuel tank areas;

BEST MODE FOR CARRYING OUT THE INVENTION

Reference is now made to FIGS. 1-6 wherein vehicle 1 comprises a main body or passenger section 3 and separable tail section 5. Passenger section 3 includes a passenger compartment or cockpit 7 covered by a removable canopy 9. Formed beneath cockpit 7 is air flow area 11 (shown more clearly in FIG. 7) having a forward opening 13. A symmetric airfoil or canard 14 is disposed around front bumper 12 of passenger section 3 and within opening 13 of air flow area 11. The attitude of canard 14 is trimmable by the operator from within cockpit 7. Mounted to the undercarriage of passenger section 3 are two wheel pairs 15 and 16. Each of the wheels is preferably of the standard automobile type and is carried on a light alloy rim. Wheels 15, at the front of section 3, are used to steer the vehicle, while rear wheels 16 are driven by engine 43 in section 3 to propel the vehicle while on the ground. Wheels 15 and 16 are the landing gear for the vehicle when it is used as an airplane. Wheel pairs 15 and 16 are mounted to the undercarriage of the passenger section 3 such that only a small portion of each wheel is exposed during flight to minimize undercarriage drag while the vehicle is flown and eliminate the need for costly and bulky retractable landing gear apparatus. Wheel pairs 15 and 16 are mounted so they present minimal interference with the airflow through area 11 to the fans.

Tail section 5 has a tapered fuselage 17, the rearward portion of which has a vertical stabilizer or rudder 19 and a horizontal stabilizer and elevator assembly 21. Rudder 19 and stabilizer 21 are formed as symmetric airfoils. Forward portion 22 of tail section 5 includes two shrouds 23 and 24 formed on opposite sides of the fuselage 17 which, respectively, surround two ducted fan propellers 25, 27. Forward portion 22 of tail section 5 encloses main fuel tank 83 and is the mounting for two wings 29 and 31.

Figures 9, 14, 15:
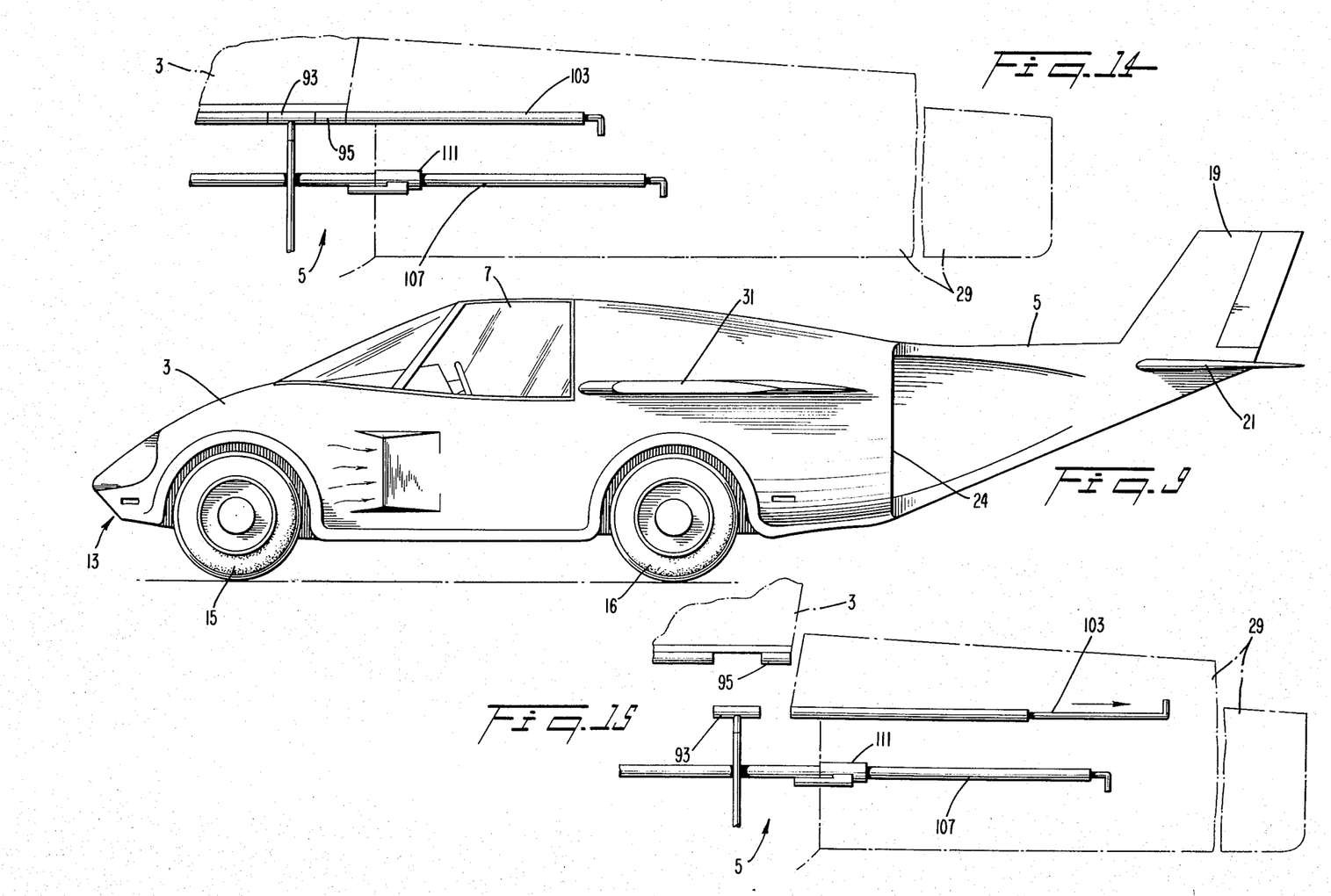
FIG. 9 is a left side view of an alternative embodiment of the invention wherein the vehicle includes a unitary body for use solely as an aircraft.
FIGS. 14 and 15 are detailed views of the wing locking and pivoting mechanism.
Figures 10A, 11A:
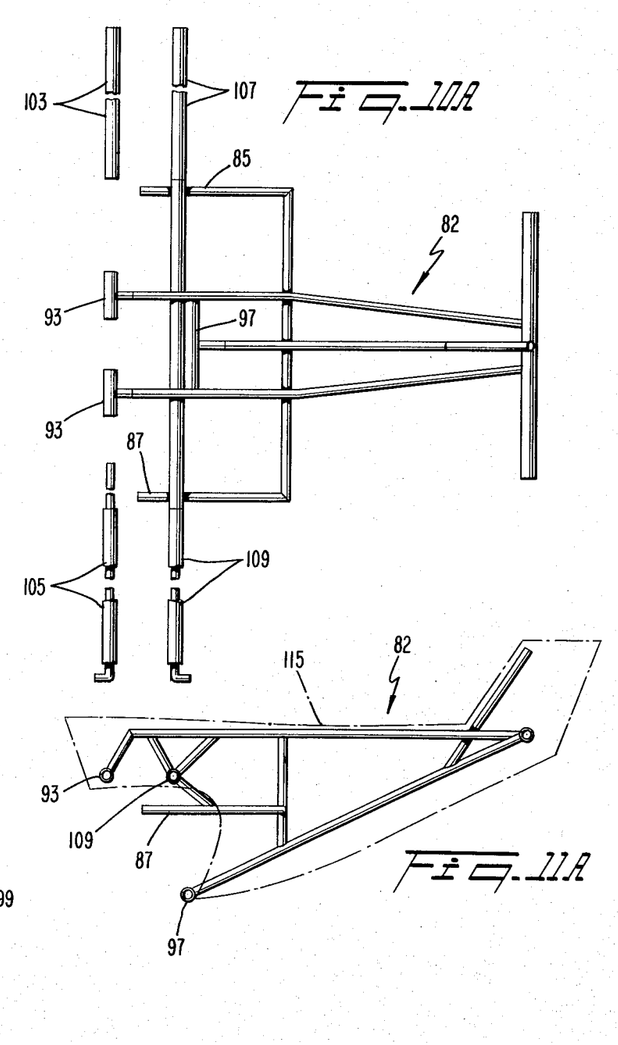
FIGS. 10A and 10B are top views respectively of the tail section and the passenger section vehicle frames.
FIGS. 11A and 11B are left side views of the vehicle frames of FIGS. 10A and 10B, respectively.
Figure 10B:
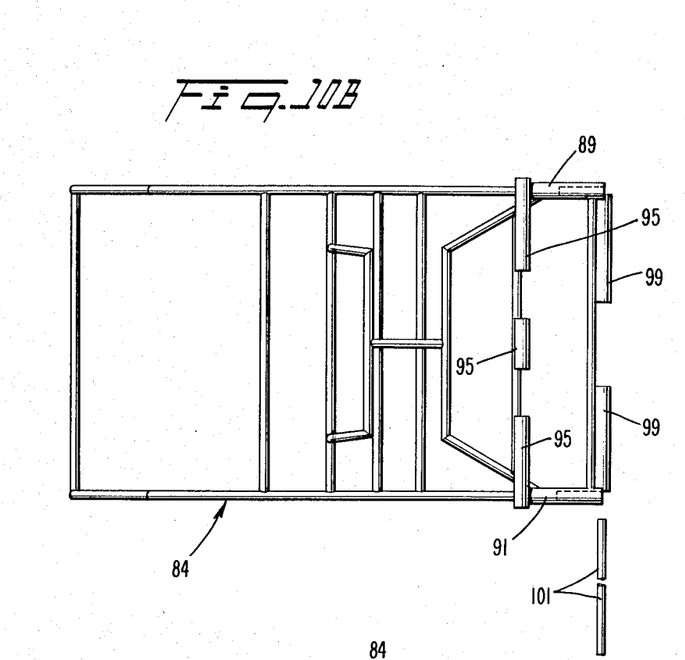
Figure 11B:
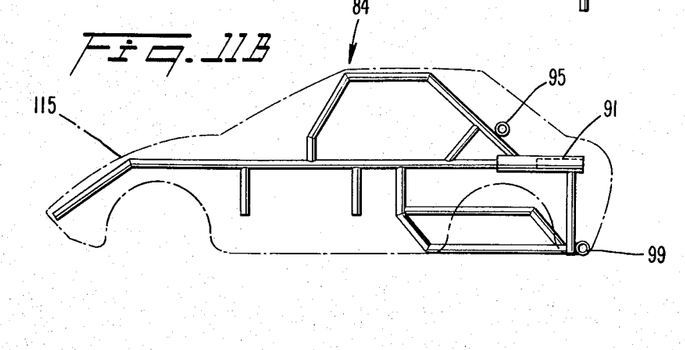
Figure 12:
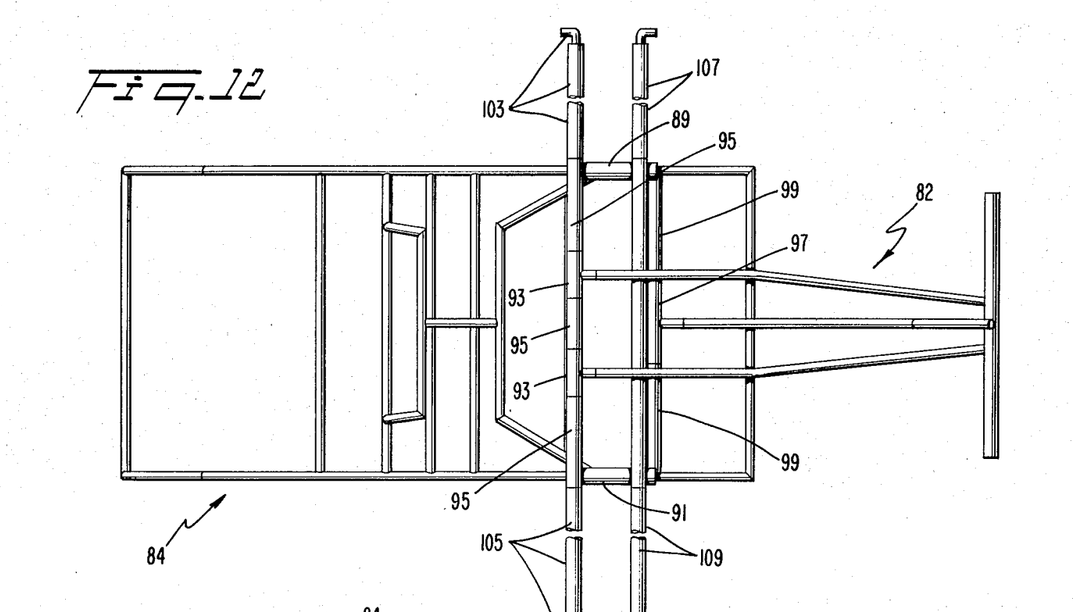
FIGS. 12 and 13 are respective top and left side views of the vehicle frames of FIGS. 10A and 10B joined together.
Figure 13:
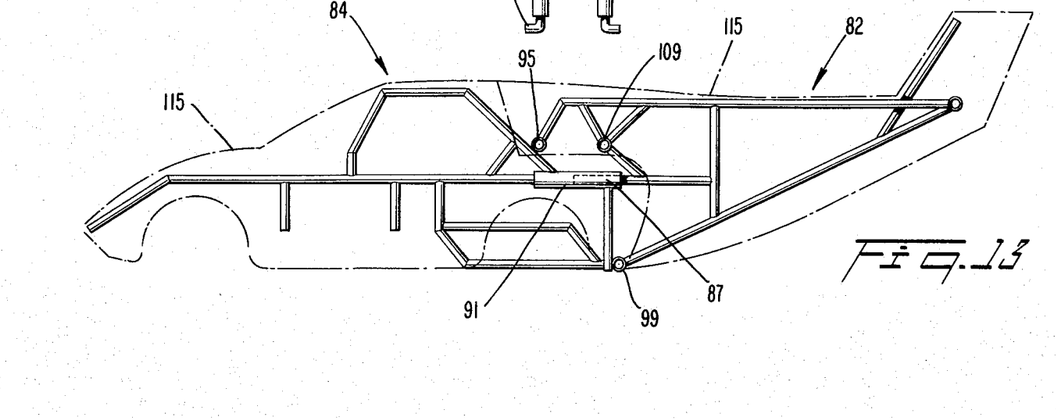

FIGS. 10A and 10B are top views of separate tail and passenger section airframes 82 and 84, respectively. Airframe 82 of tail section 5 is structurally joined to airframe 84 of passenger section 3 by a number of interfitting sliding sleeves and tubing. Tubes 85 and 87 slide into sleeves 89 and 91, respectively. When tail section 5 is completely forward, as in FIGS. 12 and 13, sleeves 93 and 95 are aligned, as are sleeves 97 and 99. Front wing spars 103 and 105 interfit through sleeves 93 and 95, and "bumper shafts" 101 (FIG. 10B) secure sleeves 97 and 99 together. FIGS. 11A and 11B are side views of separate tail and passenger airframes 82 and 84, respectively. FIGS. 12 and 13 illustrate the arrangement of airframes 82 and 84 after being joined together. In FIGS. 14 and 15 the locking and pivoting mechanism 103, 107, 111 or right hand wing 29 is shown. The mechanism of left hand wing 31 is identical. Front spar 103 interfits through sleeves 93 and 95 to secure passenger section 3 with tail section 5 as shown in FIG. 14. When shaft 103 is extended and bumper shaft 101 is removed, as shown in FIG. 15, passenger and tail sections 3 and 5 can be separated. Further extension of front shaft 103 results in wing 29 pivoting about hinged point 111, leading edge down. When rear shaft 107 is fully extended, wing 29 can be folded back along fuselage 17 and clamped to horizontal stabilizer 21. To assemble the passenger and tail sections together, the above steps are reversed. Airframes 82 and 84 are constructed from high strength aircraft grade tubing (4130 molybdenum steel tubing being typical) with a fiberglass or composite fiber skin 115.

Wings 29 and 31 are of a narrow profile, low-camber type, such as "N-9" positively cambered airfoil at the root and the "NACA M-2" symmetric airfoil at the wingtip. Design criteria for these and other NACA (National Advisory Committee on Aeronautics) airfoils can be found in *Handbook of Airfoil Sections for Light Aircraft*, M. S. Rice, Aviation Publications, P.O. Box 357, Appleton, Wis. 54911. Wings 29 and 31 have a 50" chord at the wing root, using the N-9 airfoil. The leading edge of each wing is swept back to a 25" chord at the tip (M-2 airfoil).

Figure 6:
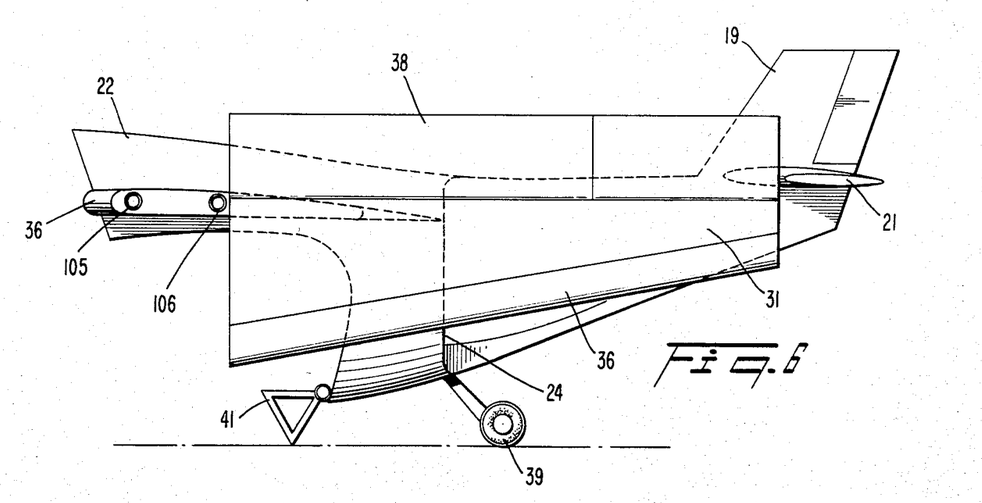
FIG. 6 is similar to FIG. 5 except that the wings are shown in a stowed position.

Such wings give good flight characteristics at high air speeds (150 knots or more) while providing minimal drag. However, to insure adequate lift at low speeds, such as during take-offs and landings, the airfoil camber can be modified by means of leading and trailing edge flaps 35, 36, and 37, 38, respectively. Wings 29 and 31 are detachable from forward portion 22 of tail section 5. Wings 29 and 31 are locked in a horizontal flying position by sliding bars 103, 105, 107 and 109, as shown in FIGS. 10A and 10B. To stow the wings after flight, sliding bars 103, 105, 107 and 109 are pulled out and the wings folded back against fuselage 17 as shown in FIG. 6.

Figure 5:
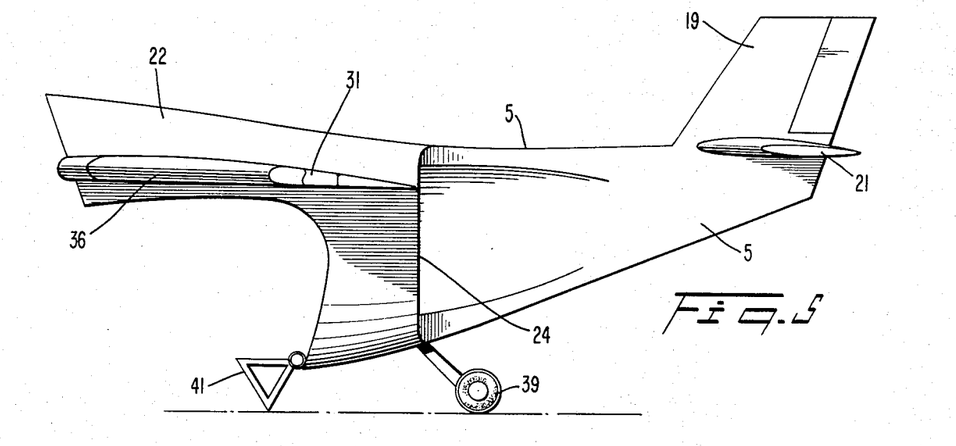
FIG. 5 is a left side view of the tail section of the vehicle shown in FIG. 1.

Tail section 5 also includes two small wheels 39 and a support 41 for use when the tail section is to be towed, tied-down or stored away between flights, as shown in FIG. 5.

Figure 8:
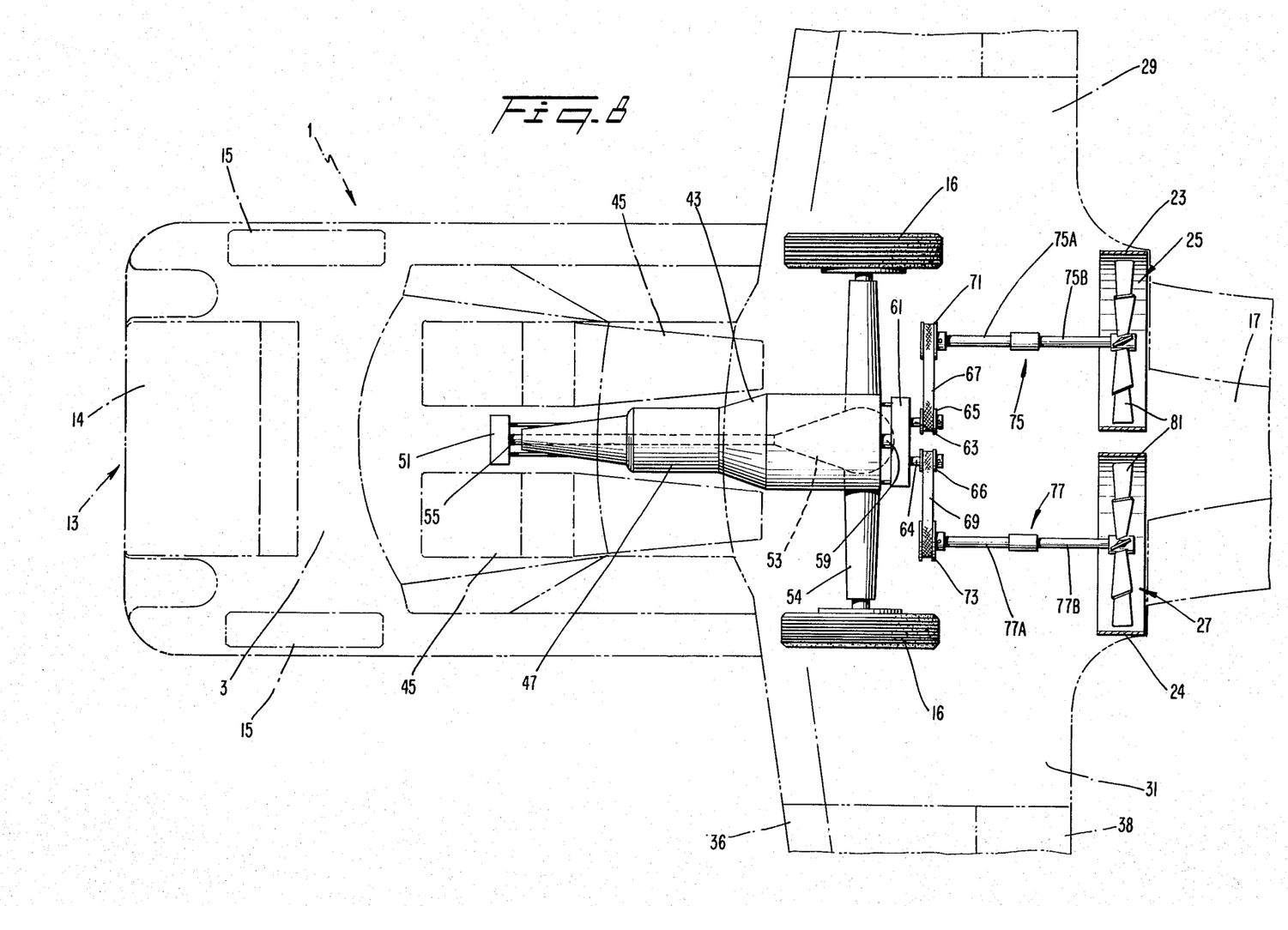
FIG. 8 is a partial sectional view of the top of the vehicle shown in FIG. 1, illustrating the arrangement of the engine, drive train, air duct and ducted fans.

As illustrated in FIGS. 7 and 8, passenger compartment 7 is as compact as possible, while providing sufficient room for internal combustion engine 43 to be mounted just aft of a pair of side by side passenger seats 45. Transmission or gear box 47 for engine 43 projects forwardly within a recess between seats 45. Engine compartment 49 projects only by a small amount into forward air flow area 11, located directly below passenger compartment 7. Placing engine 43 amidship enables the center of gravity of the entire vehicle to be close to wings 29 and 31.

It is a primary feature of the invention to drive both high-speed ducted fans 25 and 27 and rear wheels 16 of the vehicle from a single drive, i.e. engine 43. To achieve this result, rear wheels 16 are driven by engine 43 through gear box 47, "V-drive" 51, and differential 53. V-drive 51 translates rotary motion from gear box shaft 55 into rotary motion along drive shaft 57. Differential 53 drives rear wheels 16 through a split axle arrangement 54 as is well known in the automotive art. Ducted fans 25 and 27 are driven by engine 43 through a series of belts and pulleys, shown in FIG. 8. Crankshaft 59 of engine 43 is connected to a "double-shaft" gear box 61. Gear box 61 converts the rotary motion of crankshaft 59 into dual rotary output along shafts 63 and 64. Output shafts 63 and 64 are respectively provided with pulleys 65 and 66 that engage drive belts 67 and 69. Belts 67 and 69 drive pulleys 71 and 73 mounted on propeller shafts 75 and 77. Shafts 75 and 77 are respectively connected directly to ducted fans 25 and 27. Propeller shafts 75 and 77 respectively have interfitting shaft portions 75A, 75B, and 77A, 77B, as shown in FIG. 7. Portion 75A of shaft 75 is mounted within passenger section 3 and driven by belt 67, as well as pulleys 65 and 71. Portion 75B of shaft 75 is connected directly to ducted fan 25. Fan 27 is connected to output shaft 64 through portions 77A and 77B of shaft 77, belt 69, and pulleys 66 and 73. The two parts, 75A, 75B and 77A, 77B of shafts 75 and 77 respectively interfit with each other when tail section 5 is attached to passenger section 3. The fan drive train (shaft 59, gearbox 61, dual shafts 63 and 64, pulleys 65, 66, 71 and 73, belts 67 and 69, as well as shafts 75 and 77) produces counter-rotating motion in fans 25 and 27. Counter-rotating fan motion assures symmetrical thrust and flight characteristics for the vehicle while in flight. A single lightweight internal combustion engine drives the ducted fans, resulting in lower overall vehicle weight and increased fuel economy, compared to aircraft having separate engines to drive each propeller or fan.

Figure 1:
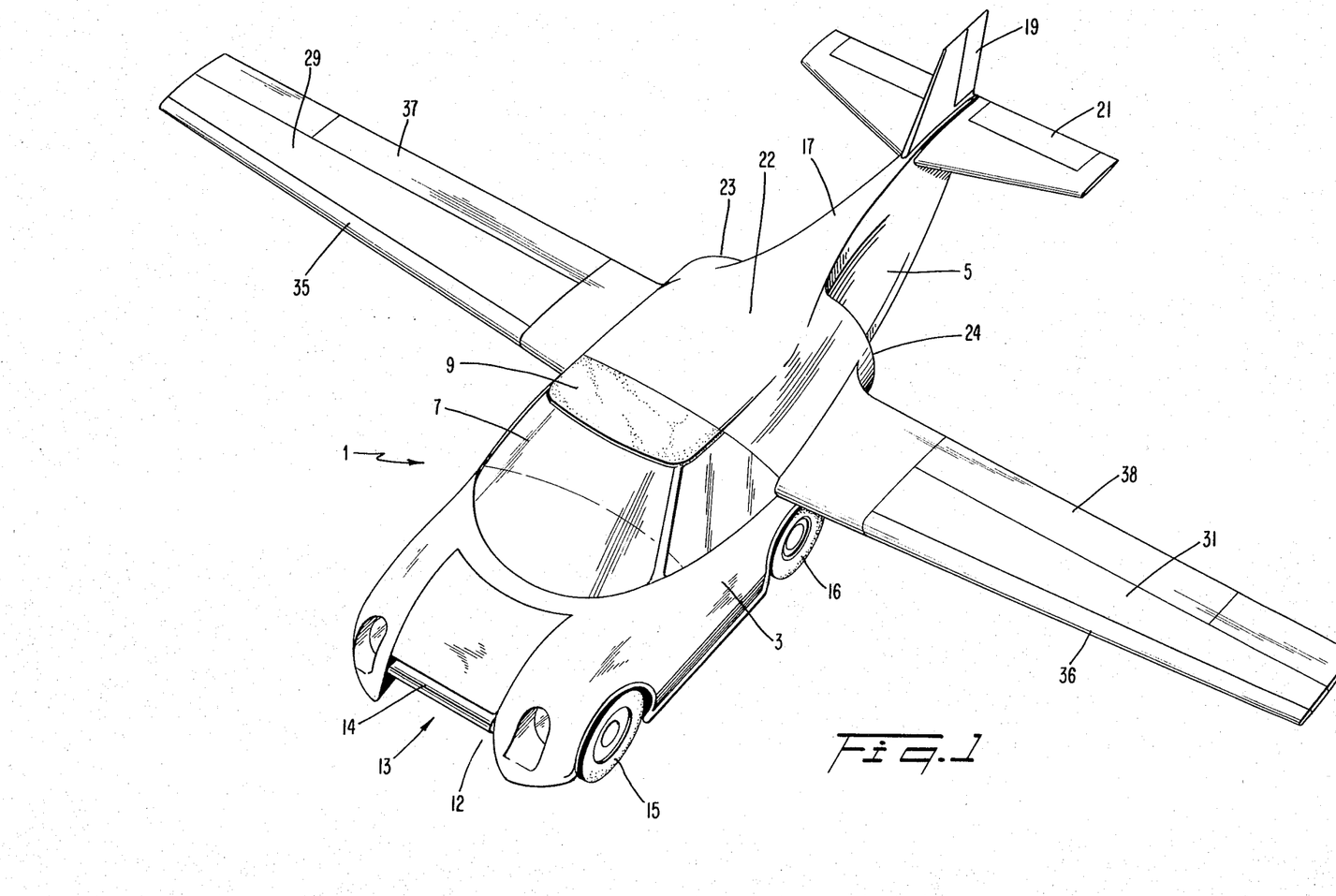
FIG. 1 is a perspective view of one embodiment of a vehicle in accordance with the present invention.
Figure 2:
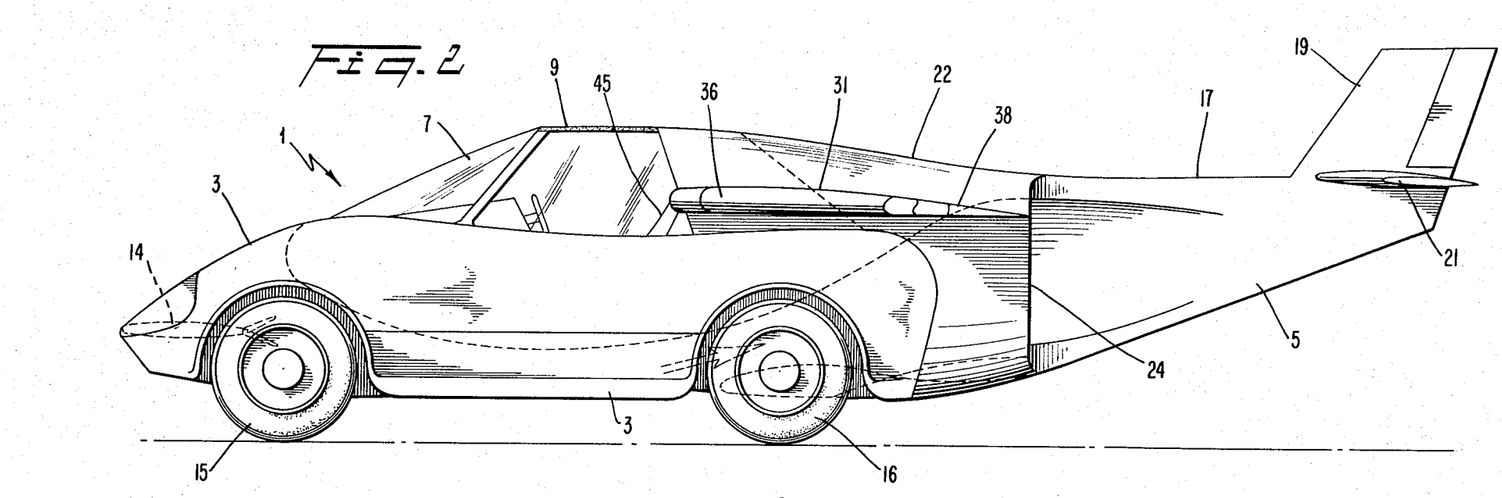
FIG. 2 is a left side view of the vehicle shown in FIG. 1.
Figure 3:
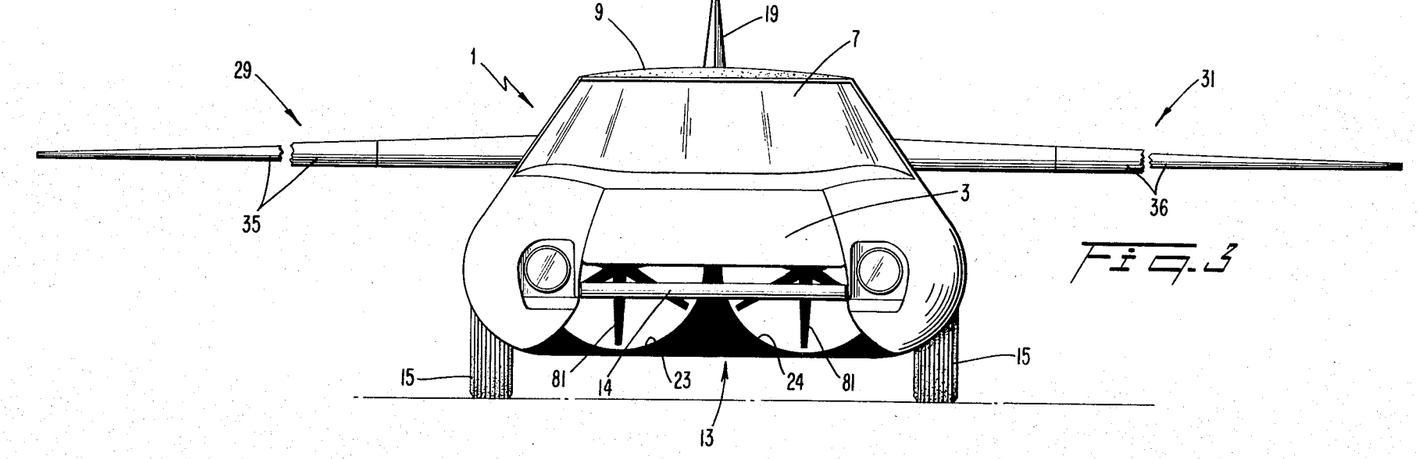
FIG. 3 is a front view of the vehicle shown in FIG. 1.

Fans 25 and 27 are respectively surrounded by shrouds 23 and 24, which together form an exit for tail air duct 79. Shrouds 23 and 24 are formed on opposite sides of tapered fuselage 17, as shown in FIGS. 1 and 8. Tapered tail air duct 79 abuts a rearward portion of passenger section air flow area 11 when passenger section 3 and tail section 5 are joined. Air entering intake 13 flows through air flow area 11, tail air duct 79, and into shrouded fans 25 and 27. Each of fans 25 and 27 includes seven propeller blades 81 radially mounted about propeller shafts 75 and 77. Smaller diameter fans (approximately 30 inches) having a large number of thin blades (6 or more) are preferred because of greater thrust-to-drag ratios. The pitch of blades 81 is fixed (at approximately 50° at the root, 25° at the tip) to give maximum thrust and efficiency at air speeds greater than approximately 70 knots. Further design criteria for ducted fan propellers is found in the publication by R. W. Hovey, *Ducted Fans for Light Aircraft*, 1977 (published by the author).

Ducted fan-type propellers can be designed to operate at high speeds or low speeds, but not both. At speeds below approximately 70 knots, high-speed ducted fans produce little or no thrust because the fan blades stall (i.e., the airflow exceeds the stall angle of attack). High-speed ducted fans possess desirably higher thrust-to-drag ratios than standard propellers, but cannot be used to propel aircraft efficiently both at low speeds (take-off, taxiing, and landing) and at high speeds (in-flight cruising). The present invention overcomes this disadvantage of prior art ducted fan aircraft by driving rear wheels 16 of passenger section 3 from engine 43 to accelerate the vehicle to a speed (approximately 70 knots) at which the high-speed ducted fans (also driven by engine 43) develop sufficient thrust to further accelerate the vehicle and propel the vehicle to take-off speed (approximately 100 knots). By suitably driving the rear wheels, the vehicle is accelerated to near take-off speed in a much slower time, using much less runway distance, than conventional aircraft designs which rely solely on the thrust of the propeller to accelerate the vehicle. The shorter take-off distances achievable with the aircraft of the present invention result in increased safety for the pilot. High-speed ducted fans are very efficient at cruising speeds (150 knots or more). In addition, ducted fans are quieter than conventional propellers because tip vortices are eliminated.

Figure 4:
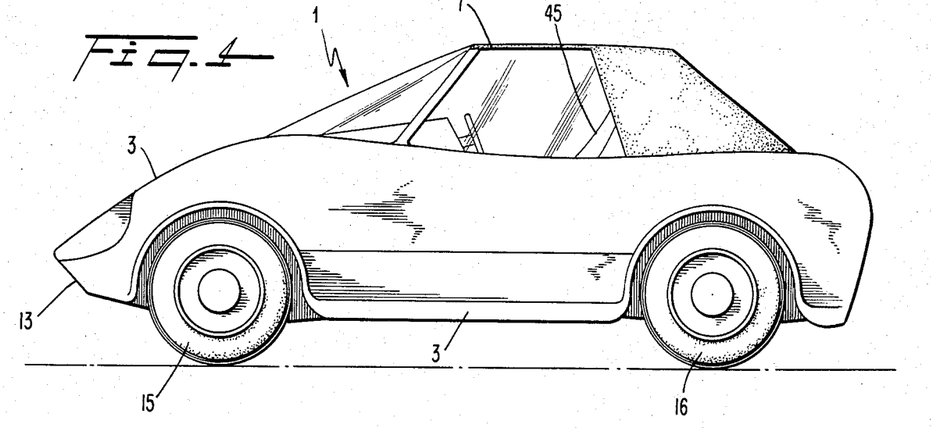
FIG. 4 is a left side view of the passenger section of the vehicle shown in FIG. 1.

Since the rear wheels 16 are driven by engine 43 contained in passenger section 3, the entire passenger section can be used as a ground vehicle (as shown in FIG. 4) when separated from tail section 5. A conventional steering mechanism (not shown) is connected to front wheel pair 15 to allow an operator to guide the vehicle while on the ground.

As shown in FIG. 7, a main fuel tank 83 is mounted between wings 29 and 31 in a forward portion 22 of tail section 5. Tank 83 holds approximately 50 gallons of fuel. Tank 83 is located between wings 29 and 31 which aids in balancing the aircraft during fuel consumption or upon refilling and reduces the number of trim adjustments which need to be made during a flight, an annoyance in many conventional light aircraft.

An auxiliary fuel tank 85 (5-10 gallons) is mounted within engine area 49 to supply fuel to engine 43 when passenger section 3 is separated from tail section 5 for use as a ground vehicle.

Engine 43 is a lightweight rotary internal combustion engine, such as the Mazda RX-4 rotary engine. Rotary engines are preferred because of high horsepower-to-weight ratios, quietness of operation, and economy of fuel consumption in comparison to piston-type internal combustion engines. Typically, rotary engines, as used in an air vehicle such as described above, develop approximately 180 horsepower at an engine speed of 9000 rpm and an airspeed of 180 knots, with fuel economy in the 20 to 30 miles per gallon range. Gearbox 47 is a two or three speed automobile type automatic transmission. Gearbox 47 is preferably placed in neutral to disengage power to rear wheel pair 16 once the vehicle has reached a speed where the ducted fans produce appreciable thrust. The vehicle continues to accelerate and is propelled to take-off speed solely on the thrust produced by the ducted fans. Other types of engines and rear wheel pair/ducted fan gearing arrangements can also be used. For example, engine 43 can be transversely mounted aft of passenger compartment 7 to drive rear wheels 16 and ducted fans 25 and 27 through appropriate gearing arrangements.

Operating controls of the vehicle are of a dual nature, that is, two separate control systems are used: one for driving, steering, and braking the passenger compartment of the vehicle; and the second system for controlling the various control surfaces of the wings, elevators and rudder. The ground vehicle control system includes a conventional steering wheel, throttle, and brake pedal (not shown). Aircraft controls are connected between passenger section 3 and tail section 5 by a number of interfacing plates (not shown) which allow the control lines to be readily disconnected when tail section 5 is separated from passenger section 3.

Other features of the invention include standard navigation lights for the aircraft, and headlights for the passenger section of the craft when used as a ground vehicle. Access to cockpit 7 is through canopy 9. A cover (not shown) fits over the exposed rear portion of passenger section 3 when separated from tail section 5.

Shown in FIG. 9 is an alternative version of the present invention wherein passenger and tail sections 3 and 5 are formed as a unitary body, when it is desired to use the vehicle solely as an airplane. Construction and operation of this embodiment of the invention is similar to that described for the land-air embodiment with the obvious elimination of redundant controls and the elimination of the need for separable connections between components in the passenger and tail sections.

Typical dimensions and characteristics of the vehicle are as follows: wing span 25 feet, overall length 18½ feet; passenger section length 10 feet; passenger section width 6 feet; cabin width 42 inches; passenger section heigh 4 feet (top of canopy to ground); cockpit height 30 inches (top of canopy to floor of cockpit); minimum ground clearance 6 inches; dry weight 1500 pounds; fuel capacity (main) 50 gallons, (auxiliary) 5 gallons; diameter of ducted fans 30 inches; take-off speed 100 knots; cruising speed 180 knots; maximum speed 220 knots; engine speed at take-off 7000 rpm, at cruising speed 9000 rpm; fuel economy at cruising speed approximately 25 miles per gallon; operating ceiling (unpressurized cabin) 17,000 feet.

Thus the present invention provides a vehicle for use in the air and on the ground which has highspeed ducted fan propulsion for efficiency, quietness and fuel economy while airborne, and which has driven rear wheels to propel the vehicle while on the ground and to accelerate the vehicle until sufficient thrust is produced by the ducted fans to continue acceleration of the vehicle and propel the vehicle into the air.

While the vehicle of the present invention has been described in considerable detail, it is understood that various changes and modifications may occur to persons of ordinary skill in the art without departing from the spirit and scope of the invention as defined in the appended claims.

I claim:

1. A vehicle capable of being used as an automobile and as an aircraft comprising:

an automobile section having steering and driven wheels, and a power plant connected to drive said driven wheels while the vehicle is being used as an automobile, said automobile being dimensioned to enable it to be driven on the ground;

an aircraft section selectively connected to said automobile section, said aircraft section including:

a fuselage, wing and tail assemblies mounted on said fuselage, high speed fan means mounted in said fuselage for propelling the vehicle while airborne, and means for driving said fan means and said driven wheels while said aircraft and said automobile sections are connected, said fan means designed to develop insufficient thrust to accelerate the vehicle during normal take-off operations while the vehicle is at low speed on the ground, said vehicle being accelerated while on the ground by said driven wheels to a speed at which the fan means develops sufficient thrust to accelerate and propel the vehicle in flight, whereby said high speed fan means is capable of achieving higher thrust-to-drag ratios at higher speeds relative to a standard propeller to a maximum predetermined high cruise airspeed for propelling the vehicle in flight in a fuel efficient manner and further including an air flow area formed below said automobile body setion, a substantially forward facing inlet opening and a pair of outlet ducts formed on opposite sides of said fuselage and communicating with said air flow area, said outlet ducts housing said high speed fan means.

2. The vehicle of claim 1 wherein said high speed fan means comprise a pair of ducted fans, each of said ducted fans including a plurality of pitched blades, said blade pitch configuration being such that said ducted fans produce appreciable thrust only as take-off speed is approached, and at greater speeds.

3. The vehicle of claim 2 wherein said ducted fans are driven in a counter-rotating manner with respect to each other.

4. The vehicle of claim 1 wherein said wings are releasably attached to a forward portion of said fuselage, each said wing comprising a low cambered narrow profile airfoil, said wings further including means for varying the camber of said airfoil.

5. The vehicle of claim 4 wherein said means for varying the camber of said airfoil comprises leading and trailing edge flaps.

6. Aircraft comprising:
a passenger section and fuselage;
landing gear, comprising driving and steering wheels mounted on said passenger section;
wing and tail assemblies mounted on said fuselage;
high speed fan means mounted in said fuselage for propelling the aircraft while airborne; and
means for driving said fan means and said driving wheels, said fan means having insufficient thrust to accelerate the aircraft into flight while at low speed on the ground during normal take-off operations, said aircraft being accelerated while on the ground by said driving wheels to speeds approaching approximately take-off speed at which speeds said fan means has sufficient thrust to accelerate said aircraft in flight and further including an airflow area formed below said passenger section, a substantially forward facing inlet opening and a pair of outlet ducts formed on opposite sides of said fuselage and communicating with said airflow area, said outlet housing said high speed fan means.

7. The aircraft of claim 6 wherein said high speed fan means comprise a pair of ducted fans, each of said duct fans including a plurality of pitched blades, said blade pitch configuration being such that said ducted fans produce appreciable thrust only as take-off speed is approached, and at greater speeds.

8. The aircraft of claim 7 wherein said ducted fans are driven in a counter-rotating manner with respect to each other.

9. The aircraft of claim 6 wherein said wings are releasably attached to a forward portion of said fuselage, each said wing comprising a low cambered narrow profile airfoil, said wings further including means for varying the chamber of said airfoil.

10. The aircraft of claim 9 wherein said means for varying the camber of said airfoil comprises leading and trailing edge flaps.

11. The vehicle of claim 1 or 6 wherein said high speed fan means comprise a plurality of ducted fans each of said ducted fans including approximately seven propeller blades radially mounted about propeller shafts wherein the blades have a pitch of approximately 50 degrees at the root and 25 degrees at the tip.

12. A vehicle capable of being used as a land vehicle and as an aircraft comprising:
a main body including:
a passenger compartment;
a motive source of power and a first source of propulsion mounted within said main body for accelerating said vehicle while on the ground as a land vehicle and for take-off as an aircraft;
a tail section including:
a fuselage;
a pair of wings mounted on said fuselage;
vertical and horizontal stabilizers mounted on a rearward portion of said fuselage; and
a second source of propulsion connected to said motive source for propelling said vehicle while it is airborne, said second source mounted on said fuselage and designed being incapable of generating sufficient thrust during normal take-off operations to accelerate the vehicle to flight while the vehicle is below aproximately take-off speed on the ground, said vehicle being accelerated while on the ground by said first source of propulsion to a speed at which the second source has sufficient thrust to accelerate and propel the vehicle in flight;
said main body and said tail section being selectively connected to each other such that said main body can be used as a land vehicle when separated from said tail section, said second source being respectively connected to and disconnected from said motive source while said body and said tail section are connected and disconnected and further including an air flow area formed below said main body, a substantially forward facing inlet opening and a pair of outlet ducts formed on opposite sides of said fuselage and communicating with said flow area, said outlet ducts housing said second source of propulsion.

13. The vehicle of claim 12 wherein said motive source comprises an internal combustion engine, said first source of propulsion includes driving wheels; said second source of propulsion includes ducted fan means; said vehicle further comprising gearing means for simultaneously driving said wheels and said ducted fan means.

14. The vheicle of claim 12 wherein said wings are releasably attached to said fuselage, each of said wings comprising a low cambered narrow profile air foil; said wings further including means for varying the camber of said air foil.

15. The vehicle of claim 12 wherein said wings have a low camber and narrow profile airfoil.

16. The vehicle of claim 15 wherein said wings include leading and trailing edge flaps to vary the chamber of said wings and provide substantial lift at low air speeds.

17. The vehicle of claim 12 wherein said second source of propulsion includes ducted fan means, wherein said ducted fan means includes a plurality of blades, each of said blades having a pitch configuration such that said ducted fan means produce appreciable thrust only as take-off speed is approached and at greater speeds.

18. Aircraft comprising:
a fuselage including a passenger compartment;
an air flow area formed below said fuselage, said flow area having minimal aerodynamic drag and having an inlet for directing air to said air flow area and a pair of duct openings formed on opposite sides of said fuselage;
landing gear comprising a plurality of wheels mounted on said passenger section;
a pair of wings mounted on said fuselage, said wings having a low cambered airfoil or narrow profile, said wings including means for varying the camber of said airfoil;
vertical and horizontal stabilizers mounted on a rearword portion of said fuselage;
a pair of high speed ducted fans mounted within said pair of duct openings formed on said fuselage for propelling the aircraft while airborne; and
drive means mounted within said fuselage and connected to a pair of said wheels and to said pair of ducted fans, said high speed ducted fans designed to be incapable of developing sufficient thrust to accelerate the aircraft into flight during normal takeoff operations while at low speed on the ground, said aircraft being accelerated while on the ground by driving wheels to speeds approaching take-off speed at which speeds said ducted fans develop sufficient thrust to accelerate and propel the aircraft in flight.

19. The aircraft of claim 18 wherein said drive means comprises a rotary-type internal combustion engine and gearing means for simultaneously driving said wheels and said ducted fans.

20. The aircraft of claim 18 wherein said ducted fans are driven in a counter-rotating manner with respect to each other.

21. The aircraft of claim 18 wherein said means for varying the camber of said airfoil comprises leading and trailing edge flaps.

22. The aircraft of claim 18 wherein said ducted fans each comprise a plurality of pitched blades producing appreciable thrust only as take-off speed is approached, and at greater speeds.

23. The vehicle of claim 17 or 22 wherein said ducted fan means include approximately seven fixed-pitch blades radially mounted about propeller shafts wherein the blades have a pitch of approximately 50 degrees at the root and 25 degrees at the tip.

24. A vehicle capable of being used as a land vehicle and as an aircraft comprising:
a passenger section including:
a cockpit;
an air flow area formed below said passenger section, said air flow having an inlet formed beneath a forward portion of said passenger section and an outlet formed in a rearward portion of said passenger section, said air flow area and inlet designed to impart minimal drag at high in-flight speeds to the vehicle;
landing gear comprising a plurality of wheels mounted on said passenger section; and
an engine mounted within said passenger section, said engine connected through gearing means to a pair of sand wheels for accelerating said vehicle while on the ground as a land vehicle and for take-off as an aircraft; and
a tail section including:
a fuselage;
a pair of wings releasably attached to a forward portion of said fuselage, each said wing comprising a low cambered narrow profile airfoil, said wing further including means for varying the camber of said airfoil;
vertical and horizontal stabilizers mounted on a rearward portion of said fuselage;
a pair of duct openings formed on opposite sides of said fuselage communicating with said air flow area formed below said passenger section;
a pair of counter-rotating ducted fans connected to said engine for propelling said vehicle while it is airborne, said fans mounted within said pair of duct openings formed on said fuselage, each fan comprising a plurality of fixed pitch blades, said fans being incapable of propelling the vehicle to take-off speed during normal take-off operation, said fans producing appreciable thrust only as take-off speed is approached, and at greater speeds, said fans designed for propelling and maintaining said vehicle in flight at speeds greater than approximately take-off speed;
said passenger section and said tail section being selectively connected to each other such that said passenger section can be used as a land vehicle when separated from said tail section, said fans, being respectively connected to and disconnected from said engine while said body and said tail section are connected and disconnected.

25. The vehicle of claim 24 wherein said tail section includes a main fuel tank mounted in a forward portion of said fuselage between said pair of wings, and wherein said passenger section includes an auxiliary fuel tank for use when said passenger section is used as a land vehicle after separation from said tail section.

26. The vehicle of claim 24 wherein said engine comprises a rotary-type internal combustion engine, said engine being located behind said cockpit.

27. The vehicle of claim 24, wherein said means for varying the chamber of said airfoil comprises leading and trailing edge flaps.

28. An improved motive system for winged aircraft having a fuselage and tail section comprising a motive source of power, driven wheels driven by the motive source for accelerating the aircraft on the ground to speeds enabling the aircraft to be airborne, a second source of propulsion driven by said motive source for accelerating the aircraft only as it attains speeds enabling it to be airborne and maintaining the aircraft in high speed fuel efficient flight, said second source of propulsion being incapable of accelerating the aircraft during normal take-off operations to speeds enabling the saime to be airborne, the first and second sources of propulsion being structures that do not add substantial aerodynamic drag to the aircraft while it is airborne whereby said second source is capable of achieving higher thrust-to-drag ratios at higher airspeeds relative to standard propellers to a maximum predetermined high cruise airspeed for propelling the aircraft in fuel efficient flight and further including an airflow area formed below said fuselage, said flow area having an inlet opening directing air into the air flow area and a pair of outlet ducts formed on opposite sides of said fuselage and communicating with said air flow area, said outlet ducts housing said second source of propulsion.

29. The system of claim 28 wherein the second source of propulsion includes high speed ducted fan means having insufficient thrust to accelerate the aircraft to speeds enabling the aircraft to be airborne.

30. The system of claim 29 wherein the ducted fan means include ducted fans having a plurality of propeller blades radially mounted about a common driven shaft each of said blades having a root and tip and pitches of approximately 50 degrees and 25 degrees at the root and tip respectively.

31. A vehicle capable of being used as a land vehicle and as an aircraft comprising:
  a passenger section including:
    a cockpit;
    an air flow area formed below said passenger section, said air flow area having an inlet formed beneath a forward portion of said passenger section and an outlet formed in a rearward portion of said passenger section;
    landing gear comprising a plurality of wheels mounted on said passenger section; and
    an engine mounted within said passenger section, said engine connected through gearing means to a pair of said wheels for accelerating said vehicle while on the ground as a land vehicle and for take-off as an aircraft; and
  a tail section including:
    a fuselage;
    a pair of wings releasably attached to a forward portion of said fuselage, each of said wings comprising a low cambered narrow profile airfoil, said wing further including means for varying the chamber of said airfoil;
    vertical and horizontal stabilizers mounted on a rearward portion of said fuselage;
    a pair of duct openings formed on opposite sides of said fuselage communicating with said airflow area formed below said passenger section, said duct openings forming a continuation of the outlets of the airflow area when the passenger and tail sections are mated;
    a pair of counter-rotating ducted fans connected to said engine for propelling said vehicle in flight, said fans mounted within said pair of duct openings formed on said fuselage, each fan comprising a plurality of fixed pitch blades, said fans being incapable of producing sufficient thrust to accelerate the vehicle to approximately take-off speed during take-off operation on the ground, said fans designed for propelling and maintaining said vehicle in flight at speeds greater than take-off speed, and at greater speeds;
  said passenger section and said tail section being selectively connected to each other such that said passenger section can be used as a land vehicle when separated from said tail section, said fans being respectively connected to and disconnected from said engine while said body and said tail section are connected and disconnected.

* * * * *

UNITED STATES PATENT AND TRADEMARK OFFICE
CERTIFICATE OF CORRECTION

PATENT NO. : 4,537,373
DATED : August 27, 1985
INVENTOR(S) : Dennis D. Burts

It is certified that error appears in the above-identified patent and that said Letters Patent is hereby corrected as shown below:

Column 7, line 28, delete "slower" and insert -- shorter --.

Column 8, line 41, delete "heigh" and insert --height--

Column 9, line 27, delete "setion" and insert --section--

Column 12, line 16, delete "sand" and insert --said--

Column 13, line 5, delete "saime" and insert --same--

Signed and Sealed this

Fifth Day of August 1986

[SEAL]

*Attest:*

DONALD J. QUIGG

*Attesting Officer*   *Commissioner of Patents and Trademarks*